March 14, 1961   C. A. ROSEN   2,975,354
ELECTRICAL CONVERSION APPARATUS
Filed Nov. 30, 1956

INVENTOR:
CHARLES A. ROSEN,
BY *Robert J. Stemmeyer*
HIS ATTORNEY.

United States Patent Office 2,975,354
Patented Mar. 14, 1961

2,975,354

ELECTRICAL CONVERSION APPARATUS

Charles A. Rosen, East Syracuse, N.Y., assignor to General Electric Company, a corporation of New York Filed Nov. 30, 1956, Ser. No. 625,347

9 Claims. (Cl. 321—8)

The present invention relates to electrical conversion apparatus and more particularly to electrical conversion apparatus comprising a piezoelectric transformer for converting an alternating voltage to a direct voltage and, in the case of an amplitude modulated alternating voltage, for recovering the modulation.

Piezoelectric transformers are relatively new devices, the properties and applications of which are still under investigation. Earlier work has centered principally about filtering characteristics and transformation ratios of the devices. In such studies, the principal interest has been in the device per se, with only secondary interest in the associated circuitry. In the present application, a novel conversion apparatus is disclosed, which provides a novel circuit employing to best advantage the unique properties not previously fully appreciated or understood, of a piezoelectric transformer for converting an alternating voltage to a direct voltage.

The piezoelectric transformers which function to best advantage in applicant's novel arrangement, are devices of moderate input and output impedance. The most successful devices are formed of polycrystalline aggregates of ferroelectric ceramics. The most common compositions of such aggregates are barium titanate with small percentages of additives such as cobalt compositions, nickel compositions, calcium titanate or lead titanate, or compositions of principally lead zirconate or principally lead metaniobate. These compositions are ferroelectric, being polarizable at elevated temperatures, and possess in large measure high dielectric constants, high mechanical Q's and high electrical to mechanical, or mechanical to electrical conversion factors. These properties lead to high electrical to electrical conversion factors, and moderate operating impedances which are appropriate for conventional electronic components.

In particular, applicant has discovered a means for facilitating the conversion of alternating current energy from such piezoelectric transformers into direct current energy, both in applications where high voltages are desired as well as in the applications where signal detection is desired.

Accordingly, it is an object of the present invention to provide a high efficiency A.C. to D.C. conversion circuit, including a piezoelectric transformer, for the production of a high direct voltage.

It is another object of the present invention to provide a high efficiency filtering and detection circuit, including a piezoelectric transformer, operating as the detector of an amplitude modulated signal.

These and other objects of the present invention are achieved by use with a resonantly-operated piezoelectric transformer having appreciable capacity between its output terminals, of a rectifier coupled in series with a load between the output terminals of the transformer in combination with a resistive conductive path shunting the output electrodes. In accordance with a preferred embodiment of the invention, the resistive conductive path is provided by an asymmetrically conducting device, poled to resist the flow of current through the path during the half cycles that power is being supplied to the resistive load and to provide a short-circuit path between the output electrodes during the period that no useful current is being provided to the load. The asymmetrically conducting device may be a high vacuum rectifier, or in certain applications, a semiconductor diode having a high inverse resistance.

The features of the invention which are believed to be novel are set forth with particularity in the appended claims. The invention itself, however, both as to its organization and method of operation, together with further objects and advantages thereof may best be understood by reference to the following description when taken in connection with the drawings, wherein:

Figure 1:
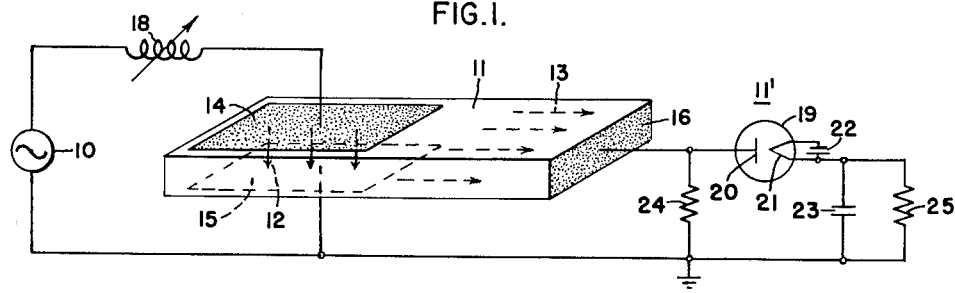
Figure 1 illustrates a first embodiment of the invention suitable for the production of high direct potentials.

A first embodiment of applicant's invention is shown in Figure 1. The high direct voltage supply there shown consists principally of an alternating voltage source 10, a piezoelectric step-up transformer 11, and a half wave rectification circuit 11' adapted to convert the high alternating potentials developed in the transformer to direct potentials.

The piezoelectric step-up transformer 11 is a thin, elongated rectangular parallelopiped formed of piezoelectric barium titanate supported in conventional fashion. The left half portion 12 of the piezoelectric body is electrically polarized in a thickness direction, while the right half portion 13 of the piezoelectric body is electrically polarized along the major axis, as illustrated by the arrows in Figure 1.

The left portion 12 of the piezoelectric body serves as the input portion of the step-up transformer. Input electrode 14 and common electrode 15 are provided upon the upper and lower surfaces of the left portion 12. These electrodes are of conductive material, such as silver, coated upon the surface of the piezoelectric member so as to create a uniform electrical field throughout the left portion in a direction parallel to the axis of polarization. Output potentials are derived from the step-up transformer 11 between the output electrode 16, which is coated upon the end of the right portion 13, and the common electrode 15. Since the piezoelectric body 11 is relatively thin and the dielectric constant is high, one may treat the common electrode 15 which extends to the center of the piezoelectric body, as being placed effectively at the center of the piezoelectric body for electrical coupling with the right half portion 13. The electrodes 15 and 16 derive potentials established in the axially polarized portion 13 of the piezoelectric body.

Transformer action may be described in the following manner. The application of electrical potentials to the input electrodes 14 and 15 create mechanical thickness vibrations, which by bulk coupling are converted to axial vibrations in the piezoelectric body. These axial vibrations are reconverted into electrical potentials in the electrodes 15 and 16. Since the electrodes 15 and 16 span a dimension of the piezoelectric body experiencing a much greater amplitude of vibration in resonance at the appropriate mode than the portion of the piezoelectric body spanned by the electrodes 14 and 15, the potentials which are obtained at the output electrodes 15 and 16 are transformed many times over those applied to the input electrodes.

The transformer 11 functions effectively in achieving a substantial voltage transformation only when operated in the region of resonance. Accordingly, in obtaining a high output voltage, it is necessary that the alternating voltage source 10, shown connected in known fashion through inductance 18 to the transformer input electrodes 14 and 15, provide a voltage having approximately the same frequency as the resonant frequency of the transformer. To further increase the voltage transformation, the inductance 18 is connected in series with the input electrodes 14 and 15. The inductance 18 provides an inductive reactance sufficient to neutralize the capacitive input reactance of the transformer 11 and to provide a resonant input circuit and facilitate effective energy transfer from the source 10 to the transformer.

The rectification circuit comprises a high vacuum rectifier 19, having an anode 20 and cathode 21, conventional filamentary heating means 22 connected to the rectifier filament, a storage capacitor 23 and a transformer discharging resistance 24. The discharging resistance 24 is coupled between the output electrode 16 and common electrode 15 of the transformer. The rectifier 19 has its anode 20 connected to transformer output electrode 16, and its cathode 21 connected to one terminal of storage capacitor 23 so as to make the latter capacitor terminal positive. The other terminal of capacitor 23 is returned to the common electrode 15. A resistive load 25 is coupled to the terminals of the capacitor 23.

Figure 2:
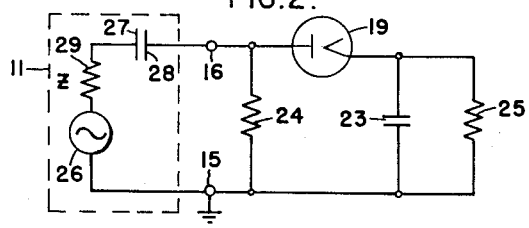
Figure 2 is an equivalent circuit diagram of the arrangement shown in Figure 1.

The rectification circuit provides rectification of alternating potentials appearing at the transformer output electrodes 15 and 16 and produces a direct voltage across the capacitor 23. Under mechanical excitation, the piezoelectric bar produces a potential difference across its output electrodes. The characteristics of the transformer as an electrical generator may best be explained by resort to the equivalent circuit diagram shown in Figure 2. The dotted outline 11 indicates an equivalent circuit viewed from the output terminals of the piezoelectric transformer. The elements external to the transformer coupled to the output terminals are as shown in Figure 1. An electrical generator 26 represents the source of voltage in the transformer when it is mechanically excited. The equivalent generator internal impedance indicated at 29 is principally the electrically transformed mechanical impedance of the bar. At mechanical resonance, this impedance, which may be represented as a resistance, inductance, and capacitance in series, is a minimum and primarily resistive in character. The capacitance 27 represents the large charge-storage between the output electrodes arising from the high dielectric constant of the material. This equivalent capacitance can be represented as being in series with the generator 26 and its internal impedance 29 between the transformer output electrodes 15 and 16. It should be noted that the generator is coupled for alternating current to its output terminals, the coupling being of minimum impedance at resonance, but the generator is completely isolated for direct current.

Accordingly, if one should couple a load through a half-wave rectifier to the output terminals 15 and 16, omitting resistance 24, one would not be able to derive any power from this connection in a steady state condition. At the initial positive half cycle of the alternating voltage developed by the generator 26, electrons would be drawn through the rectifier 19, and deposited on the plate 28 of the capacitor 27. As a result, the upper plate of the capacitor 23 would receive a positive charge, and the plate 28 of the capacitor 27 would have a negative charge, resulting from an excess of electrons. These electrons would establish a field producing a potential difference in the capacitor 27 opposing the positive voltage developed by the generator 26. As the generator 26 swung to a negative voltage, the rectifier 19 would block any change in charge distribution, and on the next positive cycle a few more electrons might be admitted for storage on the capacitor plate 28. After a few cycles of operation the electrons collected on the plate 28 would develop a field such that the potential difference across the capacitor 27 would be just equal to the peak value developed by the generator 26, but of opposite sign. At this point, the net potential difference between the output electrodes 15 and 16 available to draw current through the rectification circuit would be zero.

The provision of a discharging resistance 24 of appropriate value, connected in shunt with the transformer output electrodes 15 and 16, prevents the build up of this counter field and permits one to extract a useful direct current flow from the transformer. There are two principal considerations affecting the choice of the magnitude of the discharging resistance 24. Due to the large internal impedance of the piezoelectric transformer, a relatively high discharging resistance must be employed so that the piezoelectric transformer will generate a high A.C. voltage. On the other hand, the discharging resistance should be small enough such that the equivalent output capacitance 27 of the piezoelectric transformer can be almost completely discharged in each cycle of operation. These two conflicting requirements are best met by making the RC time constant of the equivalent output capacity and the discharging resistance approximately 1 or 2 times the time for one cycle.

A constructive embodiment of the arrangement shown in Figure 1 was found to be capable of producing an output voltage of approximately 950 volts when supplied by a source providing 60 volts of alternating voltage. The step-up transformer was formed of a piece of barium titanate 4 inches long by 1 inch wide by ⅛ inch thick, resonating at a second harmonic in a longitudinal mode of vibration at approximately 23 kilocycles. The material employed was a composition made up principally of barium titanate (approximately 92%) having a few percent also of calcium titanate and lead titanate. The resulting dielectric constant was approximately 1200, giving an output capacitance of approximately 16 micromicrofarads. The variable inductance 18 was a variable 20 millihenry inductor adjusted to 18.3 millihenries. The value of discharge resistance 24 found to give peak overall efficiency was 4 megohms. The storage capacitor 23 was .003 microfarads. A load resistance of 20 megohms was employed. With this arrangement, a power conversion efficiency from source to load of approximately 5% was obtained.

The arrangement, which has just been discussed, in providing the discharge resistance 24 makes it possible for one to derive a direct current component from the output transformer. In this process, however, considerable unnecessary power is lost in the leakage resistance during both the useful positive half cycles and the unused negative half cycles.

In the positive half cycles, useful current flow is diverted from the load 25 and dissipated in the discharging resistance 24. In the illustrative constructive embodiment, the value of resistance 24 for the time constant giving optimum power conversion efficiency is approximately one fifth the size of the load resistance 25; hence it is apparent that this loss is appreciable.

In the negative half cycle the rectifier path is open, causing the full output of the transformer to flow through the discharging resistor alone. Since for purposes of obtaining a high voltage step-up and good energy transfer, the discharging resistor must have a value commensurate with the output impedance of the transformer, the energy transfer from the transformer is also high for negative half cycles resulting in a large energy loss in the discharging resistance.

The considerations for minimization of power loss for the two half cycles are accordingly in conflict. During the positive charging half cycles, the discharging resistance should be infinite for the losses to be a minimum and for maximum power transfer to the resistive load. During the negative half cycles, however, the discharging resistance should be either a short circuit or a relatively low resistance. This latter condition will insure minimum power transfer from the piezoelectric transformer to the discharge resistance due to the extreme impedance mismatch.

Figure 3:
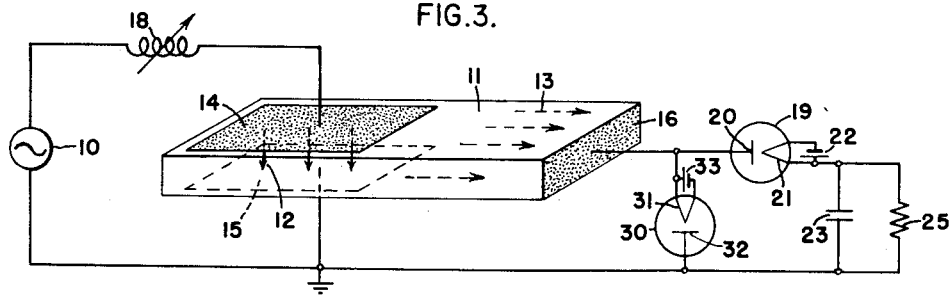
Figure 3 is a preferred embodiment illustrating the application of the invention to high direct voltage supplies.

A way to achieve minimum power loss without comprising these requirements is shown in Figure 3. In Figure 3, elements which are similar to those shown in Figure 1 retain the same reference numerals. The arrangement shown in Figure 3 is provided with a piezoelectric step-up transformer 11 having input electrodes 14 and 15 coupled respectively in a series circuit with the resonating inductance 18 across the output terminals of the alternating voltage source 10. The output electrode 16 of the piezoelectric step-up transformer is coupled to the anode 20 of the rectifier 19, while the cathode 21 of the recifier 19 is coupled to one terminal of the storage capacitor 23. The other terminal of the capacitor 23 is connected to the common electrode 15 of the transformer. A second rectifier 30 is provided having its cathode 31 connected to the output electrode 16 and its anode 32 coupled to the common electrode 15 of the piezoelectric step-up transformer. The filament of the rectifier 30 is heated by the battery 33 shown coupled to the filament.

The circuit shown in Figure 3 has been found to exhibit power conversion efficiencies nearly 4 times those found with respect to the first embodiment while employing the same piezoelectric transformer. At the same time, the voltage transformation achieved has been 5 or 6 times as high. In one constructive embodiment, an input alternating voltage of 20 volts (r.m.s.) provided an output voltage of 1660 volts D.C. Subsequently, other materials have given even higher efficiencies without deterioration of the high voltage outputs.

The embodiment shown in Figure 3 has in effect a two-valued resistance for providing an appropriate discharge path for the transformer equivalent capacitor (27) while at the same time achieving a minimum energy loss. During the periods that the output electrode 16 is furnishing a positive voltage, the diode 30, replacing resistance 24, provides the desired infinite resistance preventing any diversion of current from the useful load. During the periods that the output electrode 16 is furnishing a negative voltage, the diode constitutes a short circuit which provides an extreme mismatch to the transformer permitting a low energy loss discharge of the equivalent capacitor 27.

A closer study of the circuit in the light of the equivalent transformer circuit reveals that it possesses added advantages over those discussed above, in the nature of voltage doubling action. It may be observed that upon the occurrence of a positive half cycle in the equivalent generator 26, an excess of electrons is delivered to the electrode 16, tending to give the right hand plate 28 of the equivalent capacitor a negative charge. The diode 30 is poled to prevent any negative voltage occurring between the transformer output electrodes and prevents this charge from being stored until the next positive cycle. During the negative half cycle, however, the transformer is developing a voltage poled in the forward conduction direction of the diode 30. This causes enough electrons to flow from electrode 16 to give the equivalent capacitor 27 a positive potential on the plate 28. In the course of a succession of cycles of operation, an average charge is developed, such that its field exerts a potential difference just equal to the peak value of the negative excursions in E.M.F. of the equivalent generator 26.

The output terminal voltage of the transformer is the vector sum of the voltage of the equivalent generator 26 and the voltage across the equivalent capacitor 27. Accordingly, when the equivalent generator potential now becomes positive relative to ground, the left plate of the equivalent capacitor 27 is elevated in a positive direction, and the right plate 28, which may have a pre-existing positive potential with respect to the left plate, will be elevated simultaneously. Assuming a condition in which the plate 28 has a pre-existing positive charge, equal to the peak potential of the generator, a peak voltage appears at the transformer output terminals 15 and 16 double that of the equivalent generator 26. The rectifier 19 furnishes such a doubled voltage to the load 25.

In achieving effective doubling action, it is of course essential that there be appreciable capacity in the equivalent capacitor 27, and that the load 25 not draw current more rapidly than can be supplied by the generator 26. In the specific arrangement employed, a resistive load of 20 megohms was chosen for the particular piezoelectric transformer which had an equivalent capacitance of 17 micromicrofarads.

Previously discussed embodiments have exhibited the use of applicant's novel circuit in connection with piezoelectric transformers adapted for high voltage supplies. In providing effective high voltage operation, it is mandatory that the transformer be operated resonantly. Applicant has also determined that the invention may be applied in conjunction with a resonantly-operated ceramic transformer functioning as a radio frequency filter. In such operation, voltage transformation is not usually of so great importance as efficient power conversion. The circuit shown in Figure 4 provides efficient power conversion in the detection process of a radio frequency, amplitude modulated signal.

Figure 4:
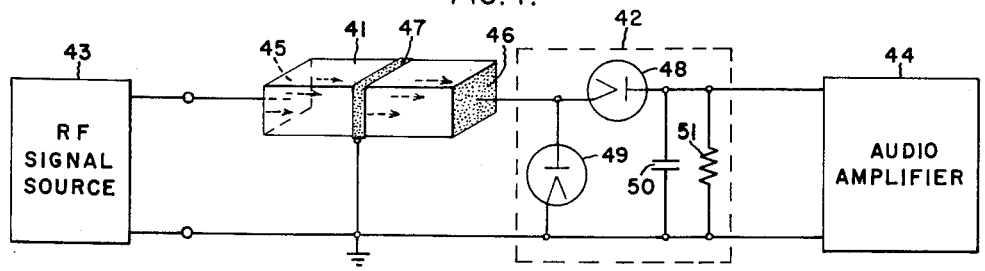
Figure 4 illustrates a preferred form of the invention as applied to a demodulation circuit for amplitude modulation signals.

The embodiment shown in Figure 4 comprises a piezoelectric transformer 41, a rectification circuit 42, a source of raido frequency signals 43 and a suitable detected signal utilization device, for example, an audio amplifier 44. The piezoelectric transformer 41 is formed of an elongated bar of piezoelectric barium titanate of square cross section, the length being approximately 200 mils and the width being approximately 100 mils so as to give a longitudinal mode of mechanical resonance at approximately 455 kilocycles. The bar is axially polarized. The input electrode 45 of the piezoelectric transformer is coated upon one end surface of the piezoelectric transformer 41 and the output electrode 46 is coated upon the opposed end of the piezoelectric transformer. Midway between the ends of the transformer, a band 47 of conductive material is placed to form the common electrode. The output terminals of the radio frequency signal source 43 are coupled respectively to the input electrode 45 and the common electrode 47. The rectification circuit comprising a first diode 48, a smoothing capacitor 50 and a load resistance 51 is coupled between the transformer output terminal 46 and the common terminal 47. The elements are connected as in Figure 3, with the exception that the diodes 48 and 49 are illustrated poled in a reverse direction to that illustrated in Figure 3; however, it should be understood that either illustrated anode connection may be adapted with equal facility depending upon the desired polarity at the output terminals. The capacitor 50 and resistance 51 are chosen so as to have an appropriate time constant for following the amplitude modulation component of the modulated signal. The capacitor 50 is chosen in accordance with conventional practice to provide a by-pass of the radio frequency carrier, and the resistance 51 is of such value as to prohibit undue loading of the ceramic transformer and to permit at the same time efficient energy transfer. Typical values for the capacitor 50 are 200 micromicrofarads with 500,000 ohms for the resistor 51. An audio amplifier 44 is coupled to the output terminals of the detection circuit 42.

The illustrated circuit can be used effectively between transistor stages as well as between vacuum tube stages. While thermionic rectifiers have been employed in the illustrated circuits, it should be appreciated that semiconductor rectifiers having high back resistances may also be employed. Suitable semiconductor diodes for this purpose are the junction type silicon diodes of present day manufacture. It should also be recognized that other piezoelectric transformers differing in geometry from those disclosed or operating on higher ordered harmonics may be employed to advantage in applicant's novel combination.

While particular embodiments of the invention have been shown and described, it should be understood that the invention is not limited thereto, and it is intended in the appended claims to claim all variations as fall in the true spirit of the present invention.

What I claim as new and desire to secure by Letters Patent of the United States is:

1. A high voltage supply comprising a piezoelectric member, means for establishing resonant vibrations therein, output electrode means applied thereto for deriving alternating electrical potentials therefrom upon the occurrence of said vibrations, said electrode means having appreciable inter-electrode capacity, a pair of unilaterally conducting devices, a storage capacitor, means coupling one of said devices in one polarity in series with said storage capacitor across said output electrode means, means coupling the other of said devices in opposite polarity across said output electrode means for providing a low impedance discharge path to the uni-directional charge developed at said output electrode means and means coupled to the terminals of said storage capacitor for deriving direct potentials from said supply.

2. A high voltage supply comprising a piezoelectric member, means for establishing resonant vibrations therein, output electrode means applied thereto for deriving alternating electrical potentials therefrom upon the occurrence of said vibrations, said electrodes having appreciable inter-electrode capacity, a rectifier, a storage capacitor, means coupling said rectifier and said capacitor in series across said output electrode means, a resistive conductive path shunting said output electrode means for providing a discharge path to the uni-directional charge developed at said output electrode means, and means coupled to the terminals of said storage capacitor for deriving direct potentials from said supply.

3. A conversion circuit comprising a piezoelectric member of ferroelectric ceramic of high dielectric constant, dimensioned to be mechanically resonant at a given frequency, input electrode means applied to said member adapted to excite resonant vibrations when potentials of a frequency in the region of said given frequency are coupled to said input electrode means, output electrode means adapted to derive potentials in the presence of resonant vibrations in said member, a half-wave rectifier, a storage capacitor, means coupling said rectifier and said capacitor in series across said output electrode means, a resistive conductive path shunting said output electrode means for providing a discharge path to the uni-directional charge developed at said output electrode means, and means coupled to the terminals of said storage capacitor for deriving rectified potentials from said supply.

4. A conversion circuit comprising a piezoelectric member of ferroelectric material of high dielectric constant dimensioned to be mechanically resonant at a given frequency, input electrode means applied to said member adapted to excite resonant vibrations in said member when coupled to a source of alternating potentials of a frequency in the region of said given frequency, output electrode means adapted to derive potentials in the presence of resonant vibrations in said member, a pair of rectifiers, a storage capacitor, means coupling one of said rectifiers in one polarity in series with said storage capacitor across said output electrode means, means coupling the other of said rectifiers in opposite polarity across said output electrode means for providing a low impedance discharge path to the uni-directional charge developed at said output electrode means, and means coupled to the terminals of said storage capacitor for deriving rectified potentials from said supply.

5. A high voltage supply comprising a piezoelectric member of ferroelectric material of high dielectric constant dimensioned to be mechanically resonant at a given frequency, input electrode means applied to said member adapted to cause vibration in said member, a source of alternating potentials of said given frequency adapted to excite said member to resonance, an inductance connected in series with said input electrode means between the terminals of said source and having a value such that the total input impedance of the series circuit so formed is substantially resistive, output electrode means adapted to derive potentials enhanced in magnitude in the presence of resonant vibrations in said member, a pair of rectifiers, a storage capacitor, means coupling one of said rectifiers in one polarity in series with said storage capacitor across said output electrodes, means coupling the other of said rectifiers in opposite polarity across said output electrodes for providing a low impedance discharge path to the uni-directional charge developed at said output electrode means, and means coupled to the terminals of said storage capacitor for deriving direct potentials from said supply.

6. A high voltage supply comprising a piezoelectric member dimensioned to be mechanically resonant at a given frequency, input electrode means applied to said member adapted to cause vibration in said member, a source of alternating potentials of said given frequency adapted to excite said member to resonance, an inductance connected in series with said input electrode means between the terminals of said source and having a value such that the total input impedance of the series circuit so formed is substantially resistive, output electrode means exhibiting appreciable capacity, adapted to derive potentials enhanced in magnitude in the presence of resonant vibrations in said member a half-wave rectifier, a storage capacitor, means coupling said rectifier and said capacitor in series across said output electrode means, a resistive path shunting said output electrode means for providing a discharge path to the uni-directional charge developed at said output electrode means and having a resistance such that the time constant formed by said interelectrode capacity and said resistance is of a value in the region of the time for one cycle at said given frequency, and means coupled to the terminals of said storage capacitor for deriving direct potentials from said supply.

7. A conversion circuit comprising a piezoelectric member of barium titanate dimensioned to be mechanically resonant at a given frequency, input electrode means applied to said member adapted to cause vibration in said member, a source of alternating potentials including components of said given frequency adapted to excite said member to resonance coupled to said input electrode means, output electrode means adapted to derive potentials from said member in the presence of resonant vibrations therein, a half-wave rectifier, a storage capacitor, means coupling said rectifier and said capacitor in series across said output electrode means, means coupling a resistive load device in shunt with the terminals of said capacitor, and an asymmetrically conducting member shunting said output electrode means for dissipation of the uni-directional charge developed at said output electrode means, poled to exhibit a high resistance during half cycles that current is passing through said rectifier to said load and exhibiting an essentially short-circuit during the half cycles that no current is being supplied to said load.

8. A conversion circuit comprising a piezoelectric member dimensioned to be mechanically resonant at a given frequency, input electrode means applied to said member adapted to cause vibration in said member, a source of alternating potentials including components of said given frequency adapted to excite said member to resonance coupled to said input electrode means, output electrode means adapted to derive potentials from said member in the presence of resonant vibrations therein, said electrodes having appreciable capacitance between them, a half-wave rectifier, a storage capacitor, means coupling said rectifier and said capacitor in series across said output electrodes, means coupling a resistive load device in shunt with the terminals of said capacitor, means shunting said output electrode means for dissipation of the uni-directional charge developed at said output electrode means adapted to provide a high resistance between said output electrodes during the half cycles that said rectifier is conducting and to provide a low resistance between said electrodes during those half cycles that said rectifier is non-conducting.

9. A demodulation circuit comprising a piezoelectric member of ferroelectric material of high dielectric constant dimensioned to be mechanically resonant at a given frequency, input electrode means applied to said member adapted to cause vibration therein, means for supplying alternating current signals including those of said given frequency to said input electrode means, output electrode means adapted to derive potentials of said given frequency from said member, a demodulation circuit including a half-wave rectifier, a filter capacitor and a load resistance, means coupling said capacitor and resistance in shunt with one another, and the two in series with said rectifier across said output means, means shunting said output electrode means for dissipation of the uni-directional charge developed at said output electrode means adapted to provide a high direct current resistance between said electrodes during those half cycles that said rectifier is conductive and to provide a low resistance between said electrodes during those half cycles that said rectifier is non-conductive.

References Cited in the file of this patent

UNITED STATES PATENTS

| | | |
|---|---|---|
| 1,450,246 | Cady | Apr. 3, 1923 |
| 1,886,815 | Hund | Nov. 8, 1932 |
| 2,072,278 | Schade | Mar. 2, 1937 |
| 2,509,913 | Espenschied | May 30, 1950 |
| 2,676,273 | Oestreicher | Apr. 20, 1954 |
| 2,830,274 | Rosen et al. | Apr. 8, 1958 |

FOREIGN PATENTS

| | | |
|---|---|---|
| 264,809 | Great Britain | Mar. 28, 1928 |
| 877,011 | Germany | May 18, 1953 |